United States Patent [19]

Tani et al.

[11] 4,125,477

[45] Nov. 14, 1978

[54] PROCESS FOR TREATING RADIOACTIVE WASTE GASES

[75] Inventors: Akira Tani, Machida; Yoshiyuki Yuasa, Yokohama; Atsushi Watanabe, Kawasaki; Bunzai An, Kobe; Masataka Soya, Kobe; Hiromi Tanabe, Kobe, all of Japan

[73] Assignee: Tokyo Shibaura Denki Kabushiki Kaisha, Japan

[21] Appl. No.: 721,810

[22] Filed: Sep. 9, 1976

[30] Foreign Application Priority Data

Sep. 13, 1975 [JP] Japan ................................. 50/111285

[51] Int. Cl.$^2$ ............................................. G21F 9/02
[52] U.S. Cl. ................................ 252/301.1 W; 55/68; 423/219
[58] Field of Search ........................... 423/219; 55/68; 252/301.1 W

[56] References Cited

U.S. PATENT DOCUMENTS

| | | | |
|---|---|---|---|
| 3,467,493 | 9/1969 | Eguchi et al. | ......................... 423/219 |
| 3,944,646 | 3/1976 | Martin | ................................. 423/219 |

OTHER PUBLICATIONS

Lyman, T. et al., Eds., *Metals Handbook*, vol. 1, American Society for Metals, Metals Park, Ohio, 1961, pp. 1150–1151.

*Primary Examiner*—Benjamin R. Padgett
*Assistant Examiner*—Deborah L. Kyle
*Attorney, Agent, or Firm*—Stevens, Davis, Miller & Mosher

[57] ABSTRACT

An improved process for treating waste gas from a nuclear power plant to recover radioactive rare gases such as Kr and Xe therefrom. The waste gas is treated with titanium, zirconium or alloys thereof to remove oxygen present in the waste gas.

8 Claims, 2 Drawing Figures

PROCESS FOR TREATING RADIOACTIVE WASTE GASES

BACKGROUND OF THE INVENTION

This invention relates to a process for treating radioactive waste gases, more particularly to a process for recovering radioactive rare gases from the waste gas of a nuclear power plant.

Apparatus as shown in FIG. 1 has been used to treat the waste gas from a nuclear power plant to recover radioactive rare waste gases. According to this method, the waste gas is pretreated in a pretreating system 1 to remove water and carbon dioxide gas and is then cooled in a heat exchanger 2 by effluent gas from a concentrator 4. Thereafter, the cooled gas is sent to a primary condenser 4 which usually comprises a low temperature adsorption bed cooled by the liquid nitrogen from a tank 3. In the primary condenser the waste gas is concentrated by a factor of about 5000, the concentrated gas consisting of a major proportion of air ($N_2$, $O_2$, etc.) and about 1/10th of rare gases, for example, (Xe, Kr, etc.). The concentrated waste gas is sent by a pump 5 to a secondary condenser 6 where the radioactive rare gases are adsorbed by an activated carbon bed and then recovered in tank 7.

Where an activated carbon bed is used in the secondary condenser, a certain amount of oxygen is also adsorbed along with the rare gases. The adsorbed oxygen is activated by the radioactivity of the radioactive rare gases and a portion thereof is converted into ozone. Since ozone is explosive, it is dangerous to recover it in tank 7 along with the rare gases. Further, the activated carbon of the bed is burnt and wasted by the heat of disintegration or heat of reaction of ozone thereby greatly decreasing the absorption capability of the activated carbon.

Because of the above noted problems, it is desirable to remove oxygen admixed with the radioactive rare gases before recovering the same.

Accordingly, a method has been proposed wherein a $H_2$-$O_2$ recombiner is used in the secondary condenser 6 instead of a low temperature absorption bed. According to this method, hydrogen gas is blown into the condenser for reaction with the oxygen. This method is advantageous for the secondary condenser because oxygen is substantially completely removed. However, it has a defect that it is necessary to install a hydrogen tank or a hydrogen generating device near the radioactive rare gas recovering system, thereby increasing the possibility of an explosion of the hydrogen, resulting in an extremely dangerous situation.

SUMMARY OF THE INVENTION

It is an object of this invention to provide a novel method of recovering radioactive rare gases which can avoid the disadvantages described above.

According to this invention, there is provided a process for treating radioactive waste gas by treating a waste gas containing oxygen and radioactive gases with one or more of the reactive metals selected from the group consisting of titanium, zirconium and alloys thereof.

In this method the oxygen contained in the radioactive waste gases is adsorbed and hence fixed by the reactive metal thereby avoiding the danger of an explosion caused by the oxygen being converted to ozone. Furthermore, since the oxygen is substantially removed, the degree of concentration of the recovered rare gases can be improved. An additional advantage of the invention is that it is not necessary to install a hydrogen tank or a hydrogen generating apparatus near the recovery apparatus, thus increasing the overall safety of the recovery system.

DESCRIPTION OF THE PREFERRED EMBODIMENTS

Figure 1:
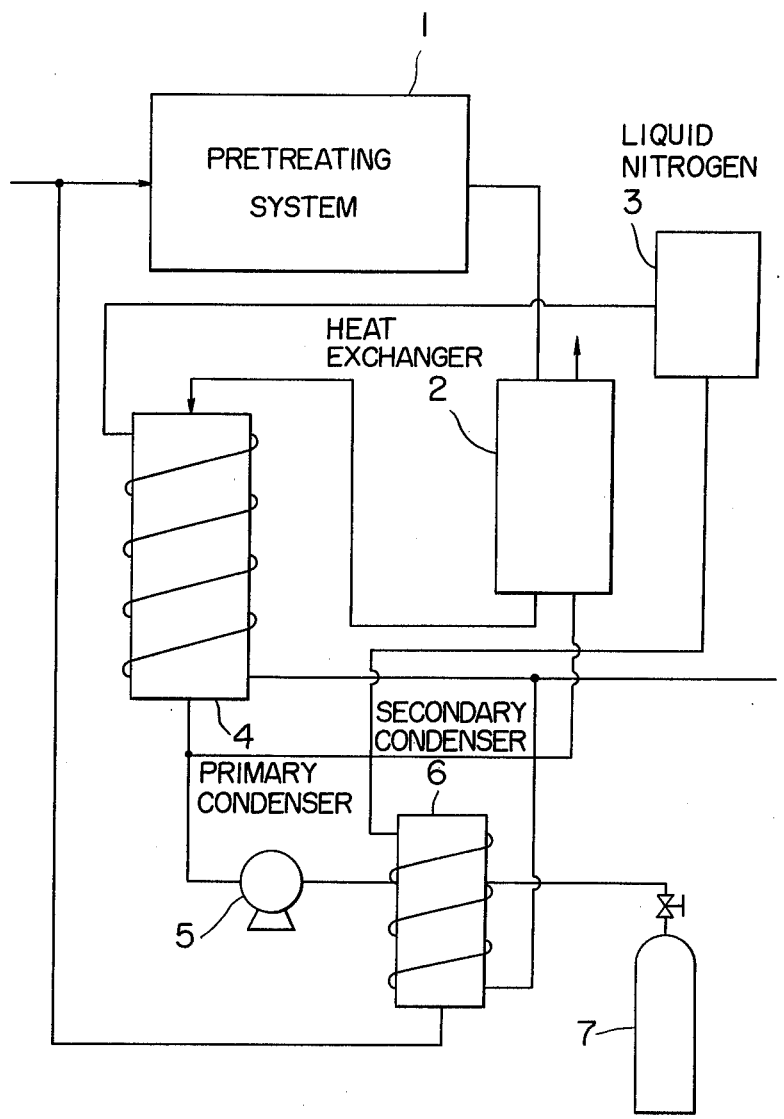
FIG. 1 is a block diagram showing a prior art method of recovering radioactive rare gases.

The invention will now be described in detail. The gas treated by the method of this invention may be any gas as long as it contains oxygen and one or more radioactive rare gases. Thus, the gas may be waste gas from a nuclear power plant. The gas is concentrated by a primary condenser by a factor of about 5000 in a manner described above. The gas concentrated by the primary condenser consists of 10 parts by volume of air (that is a mixture of $N_2$, $O_2$, etc.) and 1 part by volume of radioactive gases, (for example Xe, Kr, etc.).

The reactive metal utilized in this invention may be any metal as long as it can remove oxygen from the gas mixture but not fix the rare gases by absorption. More particularly, titanium, zirconium, titanium base alloys, zirconium base alloys, zirconium-titanium alloys, and alloys consisting essentially of titanium or zirconium are preferred. These reactive metals remove oxygen from the rare gases by forming such oxides as $ZrO_2$, and $TiO_2$ but do not absorb and fix the rare gases such as Krypton and Xenon. These reactive metals can be used either singly or in combination.

Certain components of the reactive metals other than titanium and zirconium may be used to remove gas components other than oxygen, for example, nitrogen; the types of reactive metals used being determined by the composition of a particular gas to be treated.

One important factor necessary to remove oxygen from the gas mixture is the surface area of the reactive metal; that is, the area on which the reaction with oxygen is effected. The reactivity of the reactive metal increases in proportion to its surface area. As a result, when the reactive metal is used in the secondary condenser for treating the waste gas from the nuclear reactor (in this case the volumes of oxygen and radioactive rare gases contained in the waste gas are substantially equal) the required surface area is larger than 10 $cm^2$ per 1 ml of the oxygen. In this case, titanium and or zirconium can efficiently remove the oxygen component without appreciable absorption of the radioactive rare gases.

Although the shape of the reactive metal is not limited, in order to improve its surface area and hence the adsorption capability, spherical, granular, or powdery shapes, and wire net, fiber, foil or plate shapes are all preferred.

Where a reactive metal containing one or more of titanium, titanium or zirconium base alloys and titanium-zirconium alloys is used, it is possible to remove not only oxygen but also nitrogen to some extent, thus increasing further the concentration of the recovered rare gases.

When incorporated with a suitable component, zirconium base alloys can remove not only oxygen, but also nitrogen as ZrN. Thus, when a reactive metal containing a desired amount of a zirconium base alloy incorporated with about 16% by weight of aluminum is used at a temperature of about 400° C., it is possible to remove oxygen together with a considerable amount of nitrogen.

In this reaction system, it is possible to use a mixture of reactive metals just described and a component that can remove gas components other than oxygen. For example, for the purpose of removing nitrogen, it is possible to admix the reactive metal with another metal component.

The reaction temperature for absorbing oxygen or nitrogen generally ranges from 400° to 800° C., although it differs in dependence on the type of the reactive metal used. Use of a temperature in this range is not only economical, but it also assures a satisfactory reaction of the reactive metal with oxygen and nitrogen.

Although it may differ depending upon the reaction temperature and the type of the reactive metal used the reaction pressure is generally equal to atmospheric pressure but it may be slightly higher or lower than it for economically carrying out the reaction. Thus, in this invention, the reaction pressure is not a critical factor.

Generally, the reaction time ranges from 1 to 50 hours although it may differ depending upon the reaction temperature and the type of the reaction metal used. With a reaction time of less than 1 hour, it is impossible to sufficiently fix oxygen or nitrogen. Too long a time is not economical because it takes a long time to recover the radioactive rare gases.

The reaction between oxygen or nitrogen and one or more reactive metals selected from the group consisting of zirconium, titanium, zirconium alloys, titanium alloys and zirconium-titanium alloys is effected under mild conditions as above described so that this method is extremely safe as compared to the prior art activated carbon adsorption method and $H_2$-$O_2$ recombiner method.

When the activity of the reactive metal against oxygen and nitrogen decreases substantially, in other words, when the surface of the reactive metal is entirely or substantially covered by $ZrO_2$ or $TiO_2$, the reactive metal is discarded.

Figure 2:
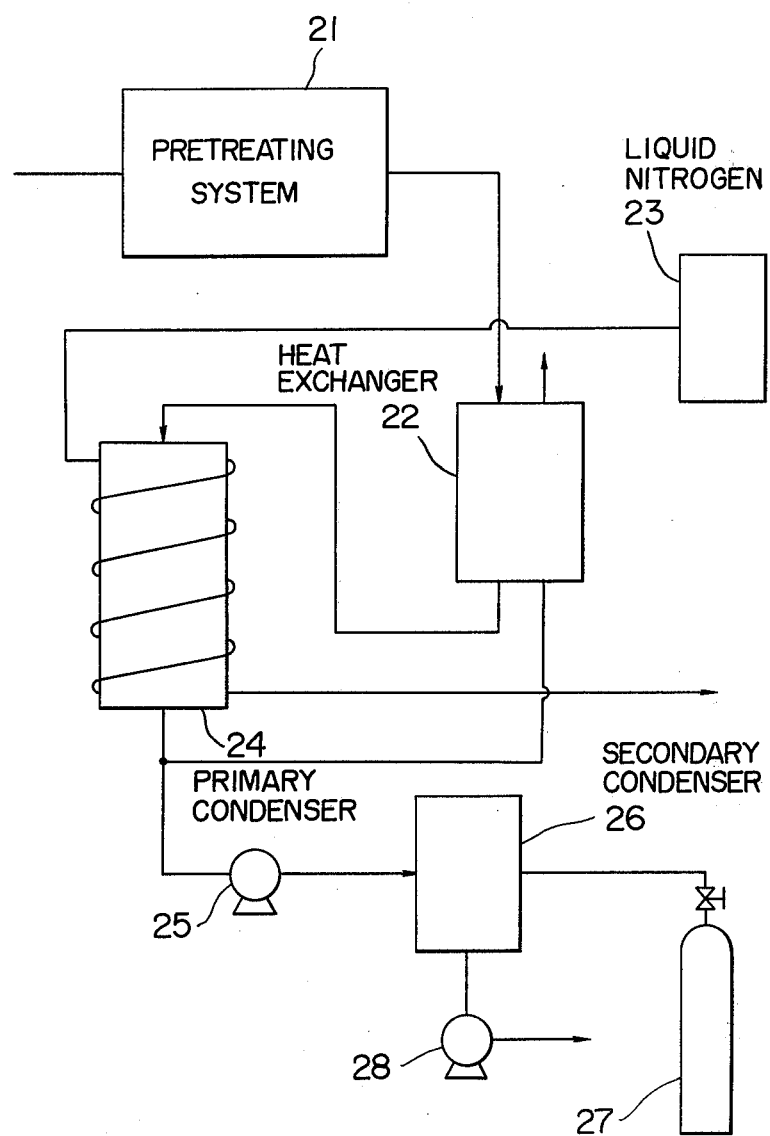
FIG. 2 is a block diagram showing the apparatus utilized to carry out the method of this invention.

One example of the arrangement of the apparatus utilized to carry out the method of this invention will now be described with reference to FIG. 2.

Waste gas from a nuclear power plant is treated by a pretreating system 21 to remove carbon dioxide and water. The gas is then cooled in a heat exchanger 22. After cooling, the gas is sent to a primary condenser 24 where it is concentrated. The gas concentrated in this manner contains a major proportion of air ($N_2$, $O_2$) and radioactive gases such as Kr, Xe of the amount about 1/10th of the amount of air. It is next sent by a pump 25 to a secondary condenser 26 containing one or more reactive metals selected from the group consisting or Zr, Ti, Zr alloys, Ti alloys, and Zr—Ti alloys. In this example, the reaction system is maintained at normal or atmospheric pressure and at a temperature between 400° and 800° C. The waste gas from which oxygen and a certain amount of nitrogen have been removed is recovered into tank 27.

The following table shows the result of treating of waste gas exhausted from a nuclear power plant and concentrated by the primary condenser, under conditions shown in the table.

Table

| metal | shape and amount (Kg) | reaction temp (° C) | reaction pressure (atm) | reaction time (hr.) | amount of gas treated (N1) | before reaction | after reaction |
|---|---|---|---|---|---|---|---|
| Zr | Sphere having a radius of 0.1 cm 6.3 | 700 | 1 | 10 | $N_2$ $O_2$ Kr Xe | 240 60 30 24 | 239 — 30 24 |
| Ti | Sphere having a radius of 0.1 cm 9.2 | 700 | 1 | 10 | $N_2$ $O_2$ Kr Xe | 240 60 30 24 | 220 — 30 24 |

We claim:

1. A process for concentrating and recovering a radioactive rare gas from a waste gas comprising the steps of:
    introducing a waste gas containing said radioactive rare gas and a mixture of oxygen and nitrogen into a primary condenser wherein said waste gas contacts a low temperature adsorption agent, and wherein said waste gas is concentrated, said concentrated waste gas containing a major proportion of said mixture and a minor proportion of said radioactive rare gas at a ratio of about 10:1 to 6:1, and
    treating said concentrated waste gas with one or more of the reactive metals selected from the group consisting of titanium, zirconium, and alloys thereof.

2. The process according to claim 1 wherein said reactive metal takes the form of a sphere, granule, powder, wire net, fiber, foil or sheet.

3. The process according to claim 1 wherein said reactive metal has a surface area of at least 10 cm² per one ml of the oxygen.

4. The process according to claim 1 wherein said treatment is effected under atmospheric pressure.

5. The process according to claim 1 wherein said treatment is effected at a temperature of 400° to 800° C.

6. The process according to claim 1 wherein said mixture contains nitrogen and oxygen at a ratio of about 4:1.

7. The process according to claim 1 wherein said zirconium alloys contain 16% by weight of aluminum.

8. The process according to claim 1 wherein said reactive metal is selected from the group consisting of zirconium and alloys thereof.

* * * * *

UNITED STATES PATENT AND TRADEMARK OFFICE
CERTIFICATE OF CORRECTION

PATENT NO. : 4,125,477
DATED : November 14, 1978
INVENTOR(S) : Akira TANI et al

It is certified that error appears in the above-identified patent and that said Letters Patent are hereby corrected as shown below:

PLEASE CORRECT THE ASSIGNEE AS FOLLOWS:

The Assignee for this Patent should read:

TOKYO SHIBAURA DENKI KABUSHIKI KAISHA; Kanagawa-Ken JAPAN; NIPPON GENSHIRYOKU JIGYO KABUSHIKI KAISHA; Tokyo-To, JAPAN; and KABUSHIKI KAISHA KOBE SEIKOSHO, Hyogo-Ken, JAPAN Signed and Sealed this Twentieth Day of March 1979

[SEAL]

*Attest:*

RUTH C. MASON
*Attesting Officer*

DONALD W. BANNER
*Commissioner of Patents and Trademarks*